United States Patent [19]

Lester et al.

[11] Patent Number: 4,701,316

[45] Date of Patent: Oct. 20, 1987

[54] PREPARATION OF SILICON NITRIDE POWDER

[75] Inventors: George R. Lester, Park Ridge; Stephen T. Gonczy, Mt. Prospect; Lawrence B. Welsh, Evanston; Gerald T. Stranford, Palatine, all of Ill.

[73] Assignee: Allied Corporation, Morristown, N.J.

[21] Appl. No.: 901,672

[22] Filed: Aug. 29, 1986

[51] Int. Cl.$^4$ .................... C01B 21/063; C01B 33/06
[52] U.S. Cl. ..................................... 423/344; 423/406
[58] Field of Search .................. 423/344, 406; 501/97

[56] References Cited

U.S. PATENT DOCUMENTS

| | | | |
|---|---|---|---|
| 4,117,095 | 9/1978 | Komeya et al. | 423/344 |
| 4,122,152 | 10/1978 | Mori et al. | 423/344 |
| 4,405,589 | 9/1983 | Iwai et al. | 423/344 |

FOREIGN PATENT DOCUMENTS

| | | | |
|---|---|---|---|
| 6017910 | 2/1981 | Japan | 423/344 |
| 0104006 | 6/1983 | Japan | 423/344 |
| 0036311 | 2/1985 | Japan | 423/344 |
| 0036312 | 2/1985 | Japan | 423/344 |

*Primary Examiner*—John Doll
*Assistant Examiner*—Lori S. Freeman
*Attorney, Agent, or Firm*—Thomas K. McBride; John F. Spears, Jr.; Raymond H. Nelson

[57] ABSTRACT

Silicon nitride powder may be prepared by subjecting a composite comprising at least a monolayer of a carbonaceous pyropolymer possessing recurring units containing at least carbon and hydrogen atoms on the surface of a silica support to the action of nitrogen-containing atmospheres at nitriding conditions to form silicon nitride.

17 Claims, No Drawings

PREPARATION OF SILICON NITRIDE POWDER

BACKGROUND OF THE INVENTION

Silicon nitride, in the form of powder, comprises a promising engineering material which will find increasing use in high temperature structural applications. This use is due to the excellent thermal and mechanical properties which are possessed by this compound. Components which have been fabricated from this material will possess high mechanical strengths at elevated temperature, good thermal shock resistance, moderate thermal conductivities, a low coefficient of thermal expansion and chemical inertness. Silicon nitride components may be utilized as a replacement for metals in heat engine applications due to the ability of this compound to withstand higher temperatures and their lower densities. This ability to withstand higher temperature constitutes a desirable factor due to the fact that the efficiency of engines increases with temperature. Furthermore, a reduction in weight will assist in increasing fuel efficiency and, in the case of turbine rotors, improve the response time.

With the increasing interest of industry in the use of silicon nitride, an economical method is required to produce a high surface area, non-agglomerated, high purity powder with a narrow particle size distribution. Silicon nitride, in the past, has been prepared by several different methods; by reacting silicon and nitrogen; by the reduction and nitridation of silica; by the decomposition of silicon diimide; by the reaction of halides, and by the decomposition of appropriate polymers.

As an example of prior methods for preparing silicon nitride, U.S. Pat. No. 4,122,152 discloses the preparation of this product by the carbothermal reduction and nitridation of silica. The process is effected by nitriding a mixture of carbon and silica in a nitrogen atmosphere at an elevated temperature for a predetermined period of time. The resulting compound contained from about 87 to 93 wt. % of alpha silicon nitride. Another patent, namely U.S. Pat. No. 4,117,095, discloses a process similar in nature to that of the previous patent, differing only in the fact that a small amount of silicon was added to the carbon and silica mixture prior to treatment with a nitriding atmosphere comprising nitrogen, ammonia, nitrogen and hydrogen, or nitrogen and an inert gas. Another U.S. Pat. No. 4,405,589 discloses the preparation of silicon nitride by mixing a compound comprising a polymer obtained from a chloroalkyl silane or a chloroalkaryl silane with $H_nSiCl_{(4-n)}$. Following this, the mixture is reacted with ammonia to form a product which is then heated to a temperature between 1200° and 1700° C. in an inert or reducing atmosphere to form silicon nitride.

BRIEF SUMMARY OF THE INVENTION

This invention relates to a process for the preparation of silicon nitride powder. More specifically, the invention is concerned with a process for preparation of silicon nitride powders in which the product obtained by this process will comprise particles having a relatively narrow range of size, will not be agglomerated, or will not be in a fibrous state, will possess a low oxygen content and low cation impurity content, and will contain a high percentage of silicon nitride in the alpha state. The desired product is obtained by subjecting a compound comprising a carbonaceous pyropolymer composited on the surface of a silica support with a nitrogen-containing atmosphere to produce the desired product. By utilizing the particular precursor which will hereinafter be described in further detail, it is possible to obtain a higher yield of silicon nitride. This yield of silicon nitride is due to the fact that the carbonaceous pyropolymer which is formed on the surface of the silica results in a coating of the silica powder in which the carbonaceous pyropolymer and silica is in an intimate mixture. Due to this intimate contact between the carbonaceous pyropolymer and silica, the resulting carbothermal reduction reaction will be more complete, thus permitting the nitriding reaction to proceed more rapidly than has been possible with previous or conventional precursors.

It is therefore an object of this invention to provide an improved process for the preparation of silicon nitride powders.

A further object of this invention is to provide a process for preparing silicon nitride powders by subjecting a silicon nitride precursor of the type hereinafter set forth in greater detail to a nitrogen atmosphere at nitriding conditions to provide the desired product.

In one aspect an embodiment of this invention resides in a process for the production of silicon nitride powder which comprises treating a compound comprising at least a monolayer of a carbonaceous pyropolymer possessing recurrent units containing at least carbon and hydrogen atoms composited on the surface of a silica support with a nitrogen-containing atmosphere at nitriding conditions, and recovering the resultant silicon nitride powder.

A specific embodiment of this invention is found in a process for the production of silicon nitride powder which comprises treating a compound comprising at least a monolayer of a carbonaceous pyropolymer possessing recurrent units containing at least carbon and hydrogen atoms composited on the surface of a silica support which has been prepared by treating a silica support with divinylbenzene, thereafter pyrolyzing said treated silica support at a temperature in the range of from about 400° to about 1200° C. and a pressure in the range of from about atmospheric to about 100 atmospheres, with a nitrogen-containing atmosphere at a temperature in the range of from about 1300° to about 1500° C. and a pressure in the range of from about 0.5 to about 25 atmospheres, and recovering the resultant silicon nitride powder.

Other objects and embodiments will be found in the following further detailed description of the invention.

DETAILED DESCRIPTION OF THE INVENTION

As hereinbefore set forth, the present invention is concerned with a process for the preparation of silicon nitride powders whereby the morphology of the silicon nitride will be in a more advantageous form than the powders which have been obtained when utilizing the precursors heretofore described. For example, when the final product resulting from the use of silicon nitride comprises a uniformly dense ceramic, it is necessary that this ceramic powder have a narrow particle size distribution and also a relatively low fibrous content. By utilizing the particular type of precursor of the present invention, it is possible to attain these objectives.

The silicon nitride precursor which is utilized in the process of the present invention comprises at least a monolayer of a carbonaceous pyropolymer possessing recurring units containing at least carbon and hydrogen atoms composited on the surface of a silica base. By utilizing such a precursor, it is possible to obtain a mol ratio of carbon to silica in a range of from about 2 to about 15 and usually in a range of from about 3 to about 9. This latter range is of advantage when subjecting the precursor to a nitriding process inasmuch as resultant silicon nitride will contain from about 87% to about 100% by weight of alpha-silicon nitride and from about 92% to about 98% by weight of crystalline silicon nitride. Additionally, since high purity silica and a high purity carbonaceous pyropolymer are used to prepare the precursor, the resultant silicon nitride will contain a low amount of cation impurities.

The desired precursor may be prepared by treating silica which will possess a surface area in the range of from about 1 to about 500 m$^2$/g with a pyrolyzable organic compound at temperature conditions which are sufficient to pyrolyze the organic compound and thus deposit at least a monolayer of the resultant carbonaceous pyropolymer possessing recurring units containing at least carbon and hydrogen atoms on the surface of the silica. The organic pyropolymer precursor which may be utilized in the formation of the precursor of the present invention may comprise members of the group consisting of aliphatic hydrocarbons, aliphatic halogen derivatives, aliphatic oxygen derivatives, aliphatic sulfur derivatives, aliphatic nitrogen derivatives, organometallic compounds, alicyclic compounds, aromatic compounds, and heterocyclic compounds. Of the aliphatic hydrocarbons, the more common classes which may be utilized to perform this invention are alkanes, alkenes, alkynes, and alkadienes. Ethane, propane, butane and pentane are among the alkanes which may be successfully used in the performance of this invention. Similarly, alkenes which suffice include ethene, propene, 1-butene, 2-butene, and 1-pentene. Alkynes which may be successfully used include ethyne, propyne, 1-butyne, 2-butyne, 1-pentyne. and 1-hexyne. 1,3-Butadiene and isoprene are included among the alkadienes which may be utilized. Among the aliphatic halogen derivatives which suffice for the purposes of this invention are monohaloalkanes, polyhaloalkanes, and unsaturated halo compounds. In the monohaloalkane subgroup, chloromethane, bromoethane, 1-iodopropane, and 1-chloro-butane may be used. Polyhaloalkanes such as carbon tetrachloride, chloroform, 1,2-dichloroethane, and 1,2-dichlorobutane may also be utilized. One unsaturated halo compound which may be utilized is chloroprene.

Aliphatic oxygen derivatives which may be utilized include the classes of alcohols, ethers, halohydrides, alkene oxides, saturated and unsaturated, aldehydes and ketones, ketenes, acids, esters, salts and carbohydrates. Some specific examples of these compounds will include ethanol, propanol, glycol, diethylether, ethylene chlorohydrin, formaldehyde, acetaldehyde, acetone, butanone, formic acid, acetic acid, oxalic acid, methylformate, ethylacetate, sodium formate, etc. Sulfur derivatives which may be used will include ethyl mercaptans, ethyl sulfide, ethyl sulfonic acid, ethyl sulfate, etc. Aliphatic nitrogen derivatives will include styrene nitroethane, acetimide, dimethylamine, ethylmethylamine, acetonitrile, etc. In addition, aromatic compounds such as benzene, toluene, naphthalene, benzyl chloride, phenol, o-cresol, anisole, phenetole, benzaldehyde, acetophenone, benzoquinone, benzoic acid, phenylacetic acid, benzene sulfonic acid, and nitrobenzene, are representative of this class of compounds.

It is also contemplated within the scope of this invention that the carbonaceous pyropolymer precursor may also comprise a monomer which is capable of being polymerized by thermal ionic or free radical polymerization methods prior to subjecting the composite to pyrolysis. In general, the solid support or substrate comprising silica is contacted with a monomer solution following which the monomer is polymerized on the surface of the support and thereafter subjected to pyrolysis. Examples of organic monomers which may be employed to produce the polymeric coating of the silica prior to pyrolysis of the composite will include such compounds as styrene, divinylbenzene, phenol-formaldehyde resins, acrylonitrile-styrene resins, allyl resin monomers, epoxy resins, melamine-formaldehyde resins, polyester resins, polyimide resins, polyurethane resins, polycarbonate resins, etc.

In the event that a polymerizable monomer is employed to coat the silica, a solution of the organic monomer is utilized to impregnate the silica support. In addition, if so desired, the admixture may also contain a polymerization initiator as an aid to polymerization, one such example being azo-bis-isobutyronitrile. The polymerization of the organic monomer is effected at polymerization conditions which will include a temperature in the range of from about ambient to about 250° C. and a pressure in the range of from about atmospheric to about 100 atmospheres. The polymerization reaction is allowed to proceed over a period of time which may range from about 1 to about 100 hrs or more, the particular polymerization time being dependent upon variables such as a particular organic monomer undergoing polymerization, as well as the operating parameters of temperature and pressure.

As can be seen, an extremely wide latitude may be exercised in the selection of the organic pyropolymer substance and it is to be understood that the above list of compounds are only representative of the type of compound which may be employed and that the present invention is not necessarily limited thereto.

The pyrolysis of the organic precursor to form the desired carbonaceous pyropolymer of the type hereinbefore set forth composited on silica is effected by heating the composite to a temperature in the range of from about 400° to about 1200° C. and at a pressure in the range of from about atmospheric to about 100 atmospheres to form the carbonaceous pyropolymer. In a preferred embodiment for effecting the pyrolysis, the pyrolysis is effected in the presence of an inert or reducing gas such as nitrogen, helium, argon, or hydrogen, said process being effected for a period of time sufficient to convert the precursor, either in monomeric or polymeric form, to the carbonaceous pyropolymer and will usually range from about 0.5 to about 4 hours or more.

The nitriding of the carbonaceous pyropolymer composited on silica may then be effected by treating the composite with a nitrogen-containing atmosphere at nitriding conditions which will include a temperature in the range of from about 1300° to about 1500° C. and a pressure in the range of from about 0.5 to about 25 atmospheres. The nitrogen-containing atmosphere which is utilized to prepare the desired product may consist of 100% nitrogen, 100% ammonia, a mixture of nitrogen and hydrogen containing from about 1% to about 80% hydrogen, or a mixture of nitrogen and ammonia containing from about 1% to about 99% ammonia. When utilizing gas mixtures containing hydrogen and ammonia, the nitrogen, hydrogen, and ammonia may individually vary from 0 to 100 mole percent as long as the sum of the mole percent of nitrogen and one-half of the mole percent of ammonia is greater than 20 mole percent. The duration of time required to obtain the silicon nitride in the optimum amount will be dependent upon varying factors including temperature and pressure, and may range for a period of time from about 1 to about 16 hours or more.

The preparation of silicon nitride powders may be effected in any manner suitable in the art and may comprise either a batch or continuous type operation. For example, when a batch type operation is utilized, the precursor which comprises the carbonaceous pyropolymer composited on a silica support will be ground by conventional means such as ball milling to a powder in which the size of the particles comprising the powder are within a predetermined range of sizes. In the preferred embodiment of the invention, the particles will usually be in a range of from about 50 to about 250 micrometers. Following the grinding of the powder, the powder is then placed upon a suitable receptacle such as a tray. The receptacle is then placed in an apparatus such as a tube furnace. The furnace is then heated to the desired operating temperature and the nitrogen-containing atmosphere is passed over the precursor for a period of time within the range hereinbefore set forth. At the end of the predetermined time, heating is discontinued, and after the furnace has returned to room temperature the desired silicon nitride powder is recovered.

Alternately, the nitriding of the carbonaceous pyropolymer composite on silica may also be effected in a continuous manner of operation. When such a type of operation is used, the precursor, in the form of powder having a particle size within the range previously set forth, is continuously charged to a nitriding or reaction zone which is maintained at the proper operating conditions of temperature and pressure. The rate of charge to the zone will be controlled so that the powder will be exposed to the action of the nitrogen-containing atmosphere for a period of time sufficient to form the desired silicon nitride. After passage through the reaction zone, the desired silicon nitride powder is continuously discharged from the zone and recovered.

It is also contemplated within the scope of this invention that, if so desired, a relatively small amount of a silicon nitride seed may be admixed with the organic monomer or polymer precursor which is utilized to impregnate the silica, said addition of the seed being effected prior to pyrolysis of the organic material to form the carbonaceous pyropolymer. The amount of silicon nitride seed may be present in an amount in the range of from about 0.1 to about 10 wt. % based upon the silica.

The following examples are given for purposes of illustrating the process of the present invention. However, it is to be understood that these examples are given merely for purposes of illustration and that the present invention is not necessarily limited thereto.

EXAMPLE I

A reference material was prepared by dispersing 10 g of amorphous silica in 300 milliliters of deionized water with the aid of a magnetic stirrer. Another dispersion was prepared by mixing 8 grams of carbon with 700 milliliters of deionized water. In both dispersions, a 500 watt sonic probe was used to break down the agglomerate size. The silica dispersion was slowly added to the carbon dispersion and admixed with a magnetic stirrer for a period of two hours. Thereafter the water was allowed to slowly evaporate at room temperature for several days. This precursor had a carbon to silica mole ratio of 4.

A second reference material was prepared in a similar manner utilizing 5 grams of silica and 10 grams of carbon powders. After the materials were mixed together, the dispersion was poured onto a glass tray and dried at a temperature of 80° C. This precursor had a carbon to silica mole ratio of 10.

The precursors were ground to finer than 250 micrometers using an alumina mortar and pestle. The ground precursors were then placed in a graphite tray which was thereafter placed upon an alumina "dee" tube so that the tray was located in the widest part of the furnace tube. The precursor was spread over ½ of the tray to form a powder bed which was 2–5 millimeters thick, said bed being centered in the hot zone of the furnace.

The nitriding reaction was effected in a tube furnace using a 70 mm inside diameter alumina tube which had stainless steel end caps clamped to the ends thereof. The nitriding atmosphere was passed over the powder by flowing into the furnace at one end and exiting at the other end of the tube. One of the end caps was fitted with a thermocouple protection tube in order to monitor the temperature of the furnace with an external thermocouple. In addition, radiation shields, the composition of which was predominantly alumina, were placed into each end of the tube at a distance of about 80 mm. The radiation shields acted to maintain a gradual temperature gradient along the tube to prevent thermal shock and to protect the Viton gaskets which formed a seal between the alumina tube and the end cap from being adversely affected by the heat. The furnace was evacuated and then backfilled with nitrogen. The temperature of the furnace was increased from room temperature to 1,000° C. under flowing nitrogen during a period of 5 hours. When the temperature had reached 1,000° C., the gas flow rates were adjusted to the desired values and the furnace was heated up to 1410° C. during a period of two hours. The furnace was programmed to hold at this temperature for a period of either 10 or 16 hours and then cooled to room temperature over an extended period of 7 hours.

The nitrogen-containing atmospheres which were used to nitride the precursor comprised 100% nitrogen; 95% nitrogen —5% hydrogen; and 85% nitrogen —15% hydrogen. The gases were passed through a gas purifier to reduce the oxygen and water contents to less than 1 ppm before entering the furnace. After completion of the desired nitriding, the resulting silicon nitride was recovered. Inasmuch as the precursor always possesses a carbon to silica mole ratio of greater than 2, the excess carbon was removed by transferring the product to a fused quartz crucible which was heated to a temperature of 700° C. in air to burn out the residual carbon. The characterization of the final silicon nitride is set forth in Table I below:

TABLE 1

| Sample | Product Composition Weight Percent | | | Phase Content of $Si_3N_4$ Component | | Nitriding Atmosphere |
|---|---|---|---|---|---|---|
| | $Si_3N_4$ | $SiO_2$ | C | $\alpha$-$Si_3N_4$ | $\beta$-$Si_3N_4$ | |
| A | 91.9 | 8.3 | 0.62 | 64 | 36 | $N_2$ |
| A | 97.5 | 1.6 | 0.82 | 94 | 6 | $N_2$-15% $H_2$ |

TABLE 1-continued

| Sam-ple | Product Composition Weight Percent | | | Phase Content of Si₃N₄ Component | | Nitriding Atmosphere |
|---|---|---|---|---|---|---|
| | $Si_3N_4$ | $SiO_2$ | C | $\alpha$-$Si_3N_4$ | $\beta$-$Si_3N_4$ | |
| B | 93.2 | 6.3 | 0.59 | 69 | 31 | $N_2$ |
| B | 95.8 | 2.9 | 1.30 | 96 | 4 | $N_2$-5% $H_2$ |
| B | 96.3 | 3.8 | NA | 92 | 8 | $N_2$-15% $H_2$ |

Cation Impurity Contents: 0.801 wt. %
A ... $C/SiO_2$ = 4
B ... $C/SiO_2$ = 10

EXAMPLE II

To illustrate the process for obtaining silicon nitride powders by the nitriding of a carbonaceous pyropolymer composited on a silica support, fumed silica powder was placed in a rotary furnace. A heating rate of approximately 300° C. per hour was used and a flowing nitrogen atmosphere (99.99% pure) was maintained in the furnace. When the temperature of the furnace reached 800° C., toluene, which had been preheated to a temperature of 180° C., was introduced into the furnace at a rate of 1 milliliter per minute. At the end of a 2.5 hour period, the furnace power was switched off and the flow of toluene was halted. After allowing the furnace to cool for a period of 16 hours, the carbonaceous pyropolymer composited on the silica was recovered. This precursor had a carbon/silica mole ratio of 9.9.

The precursor formed according to the above program was then nitrided in a manner similar to that set forth in Example I above, utilizing the same equipment as described in this example. After nitriding the precursor with a nitrogen-containing atmosphere comprising 100% nitrogen; 95% nitrogen-5% hydrogen; and 85% nitrogen-15% hydrogen, the nitrided powder was recovered. This powder was labeled as "C" and results of analysis are set forth in Table 2 below:

TABLE 2

| Sample | Product Composition Weight Percent | | | Phase Content of Si₃N₄ Component | | Nitriding Atmosphere |
|---|---|---|---|---|---|---|
| | $Si_3N_4$ | $SiO_2$ | C | $\alpha$-$Si_3N_4$ | $\beta$-$Si_3N_4$ | |
| C | NA | NA | 0.87 | 85 | 15 | $N_2$ |
| C | 96.5 | 3.5 | NA | 97 | 3 | $N_2$-5% $H_2$ |
| C | 96.1 | 3.9 | NA | 87 | 13 | $N_2$-15% $H_2$ |

Cation Impurity Contents: 0.986 wt. %
C ... $C/SiO_2$ = 9.9

EXAMPLE III

To illustrate the use of a polymer composited on silica which is thereafter pyrolyzed, a mixture of 100 g of divinylbenzene and 100 milliliters of toluene was placed in an ice bath to prevent polymerization. The solution was stirred with a magnetic stirrer as 10 g of silica were added in small increments. After mixing the silica and divinylbenzene, 0.12 g of azo-bis-isobutyronitrile (AIBN) was added as a free radical initiator to initiate polymerization. The solution was placed in a vacuum oven at ambient temperature for a period of 72 hours. Thereafter the temperature of the oven was raised to 60° C. and maintained thereat for a period of 24 hours to assist in the polymerization and then to remove the solvent. The material was then placed in a quartz tube and heated to a temperature of 800° C. in a flowing nitrogen atmosphere. The resulting precursor had a carbon/silica mole ratio of 5.7.

Again this precursor was subjected to nitridation in a manner similar to that set forth in the above examples. After recovery, analysis of the silica powder disclosed the results set forth in Table 3 below, said samples being labeled "D":

TABLE 3

| Sam-ple | Product Composition Weight Percent | | | Phase Content of Si₃N₄ Component | | Nitriding Atmosphere |
|---|---|---|---|---|---|---|
| | $Si_3N_4$ | $SiO_2$ | C | $\alpha$-$Si_3N_4$ | $\beta$-$Si_3N_4$ | |
| D | 62.9 | 36.3 | 0.72 | 83 | 17 | $N_2$ |
| D | 85.7 | 13.2 | 1.17 | 87 | 13 | $N_2$-5% $H_2$ |
| D | 90.7 | 8.4 | 0.86 | 93 | 7 | $N_2$-15% $H_2$ |

Cation Impurity Contents: 0.349 wt. %
D ... $C/SiO_2$ = 5.7

EXAMPLE IV

In this example a precursor was prepared in a manner similar to that set forth in Example III, the precursor having a carbon/silica mole ratio of 3.8. The precursor was prepared by mixing 40.44 g divinylbenzene with 100 milliliters of toluene and thereafter adding 10 grams of silica in small increments while mixing the solution with a magnetic stirrer. Again, to initiate polymerization, 0.037 grams of AIBN was added to the mixture. The mixture was placed in a dryer at 60° C., and after polymerization had been effected, the temperature was slowly raised to 150° C. over a period of several days to aid in the removal of the toluene solvent. After drying, the material was placed in an alumina tray and heated to a temperature of 800° C. in a flowing nitrogen atmosphere.

The precursor was then nitrided under conditions similar in nature to those hereinbefore set forth and the resulting silicon nitride powder which was labeled as "E" was analyzed. These results are set forth in Table 4 below:

TABLE 4

| Sam-ple | Product Composition Weight Percent | | | Phase Content of Si₃N₄ Component | | Nitriding Atmosphere |
|---|---|---|---|---|---|---|
| | $Si_3N_4$ | $SiO_2$ | C | $\alpha$-$Si_3N_4$ | $\beta$-$Si_3N_4$ | |
| E | NA | NA | 1.12 | 95 | 5 | $N_2$ |
| E | 98.3 | 1.7 | 0.51 | 94 | 6 | $N_2$-5% $H_2$ |
| E | 97.7 | 1.6 | 0.70 | 92 | 8 | $N_2$-15% $H_2$ |

Cation Impurity Contents: 0.349 wt. %
E ... $C/SiO_2$ = 3.8

EXAMPLE V

In this example, 100 grams of divinylbenzene and 10 grams of silica were admixed in 100 milliliters of toluene, and 0.02 g of alpha-silicon nitride were added. The resulting mixture was dried in a vacuum oven at 50° C. and after polymerization, was pyrolyzed at a temperature of 800° C. in flowing nitrogen in a vertical tube furnace. The resulting precursor had a carbon/silica mole ratio of 6.7.

As in the above examples, this precursor was then nitrided by treatment in an alumina tube furnace at a temperature of 1410° C. in the presence of a nitrogen-containing atmosphere comprising 100% nitrogen; 95% nitrogen —5% hydrogen; 85% nitrogen —15% hydrogen. After recovery of the silicon nitride powder which was labeled "F", analysis disclosed the results set forth in Table 5 below:

TABLE 5

| Sample | Product Composition Weight Percent | | | Phase Content of $Si_3N_4$ Component | | Nitriding Atmosphere |
| --- | --- | --- | --- | --- | --- | --- |
| | $Si_3N_4$ | $SiO_2$ | C | $\alpha$-$Si_3N_4$ | $\beta$-$Si_3N_4$ | |
| F | 81.1 | 18.1 | 0.77 | 98 | 2 | $N_2$ |
| F | 91.3 | 6.9 | 0.70 | >99 | <1 | $N_2$-5% $H_2$ |
| F | 95.6 | 4.4 | NA | >99 | <1 | $N_2$-15% $H_2$ |

F ... $C/SiO_2$ = 6.7

We claim as our invention:

1. A process for the production of silicon nitride powder which comprises treating a silica support having a surface area in the range of from about 1 to about 500 m²/g by impregnating said support with an organic pyropolymer precursor, pyrolyzing said treated silica support at a temperature in the range of from about 400 to about 1200° C. and at a pressure in the range of from about atmospheric to about 100 atmospheres to form a carbonaceous pyropolymer possessing recurring units containing at least carbon and hydrogen atoms composited on the surface of said silica support, subjecting said support to nitriding conditions including a nitrogen-containing atmosphere which comprises a mixture of nitrogen and hydrogen to yield silicon nitride powder, and recovering the resultant silicon nitride powder.

2. The process as set forth in claim 1 in which said nitriding conditions include a temperature in the range of from about 1300° to about 1500° C. and a pressure in the range of from about 0.5 to about 25 atmospheres.

3. The process as set forth in claim 1 in which said hydrogen is present in said mixture in a range of from about 1% to about 80%.

4. The process as set forth in claim 1 in which said nitrogen-containing atmosphere further comprises ammonia.

5. The process as set forth in claim 1 in which the mole ratio of carbon to silica in said compound is in a range of from about 2 to about 15.

6. The process as set forth in claim 1 in which said silica support comprises fumed silica powder.

7. The process as set forth in claim 1 in which said silicon nitride powder contains from about 87% to about 100% by weight of alpha-silicon nitride.

8. The process as set forth in claim 1 in which said silicon nitride powder contains from about 92% to about 98% by weight of crystalline silicon nitride.

9. The process as set forth in claim 1 in which said organic pyropolymer precursor comprises an organic monomer which is capable of undergoing polymerization prior to pyrolyzation thereof.

10. The process as set forth in claim 9 in which said organic monomer is polymerized at a temperature in the range of from about ambient to about 250° C. and a pressure in the range of from about atmospheric to about 100 atmospheres.

11. The process as set forth in claim 1 in which said pyrolyzation is effected in an inert or reducing atmosphere.

12. The process as set forth in claim 11 in which said inert or reducing atmosphere is provided for by the presence of a gas selected from the group consisting of nitrogen, helium, argon and hydrogen.

13. The process as set forth in claim 1 in which said organic pyropolymer precursor comprises toluene.

14. The process as set forth in claim 1 in which said organic pyropolymer precursor comprises benzene.

15. The process as set forth in claim 1 in which said organic pyropolymer precursor comprises cyclohexane.

16. The process as set forth in claim 9 in which said organic monomer comprises styrene.

17. The process as set forth in claim 9 in which said organic monomer comprises divinylbenzene.

* * * * *